July 13, 1943.  E. S. MacPHERSON  2,324,007
EQUALIZED HYDRAULIC BRAKE SYSTEM FOR SIX WHEELED VEHICLES
Filed Nov. 6, 1942
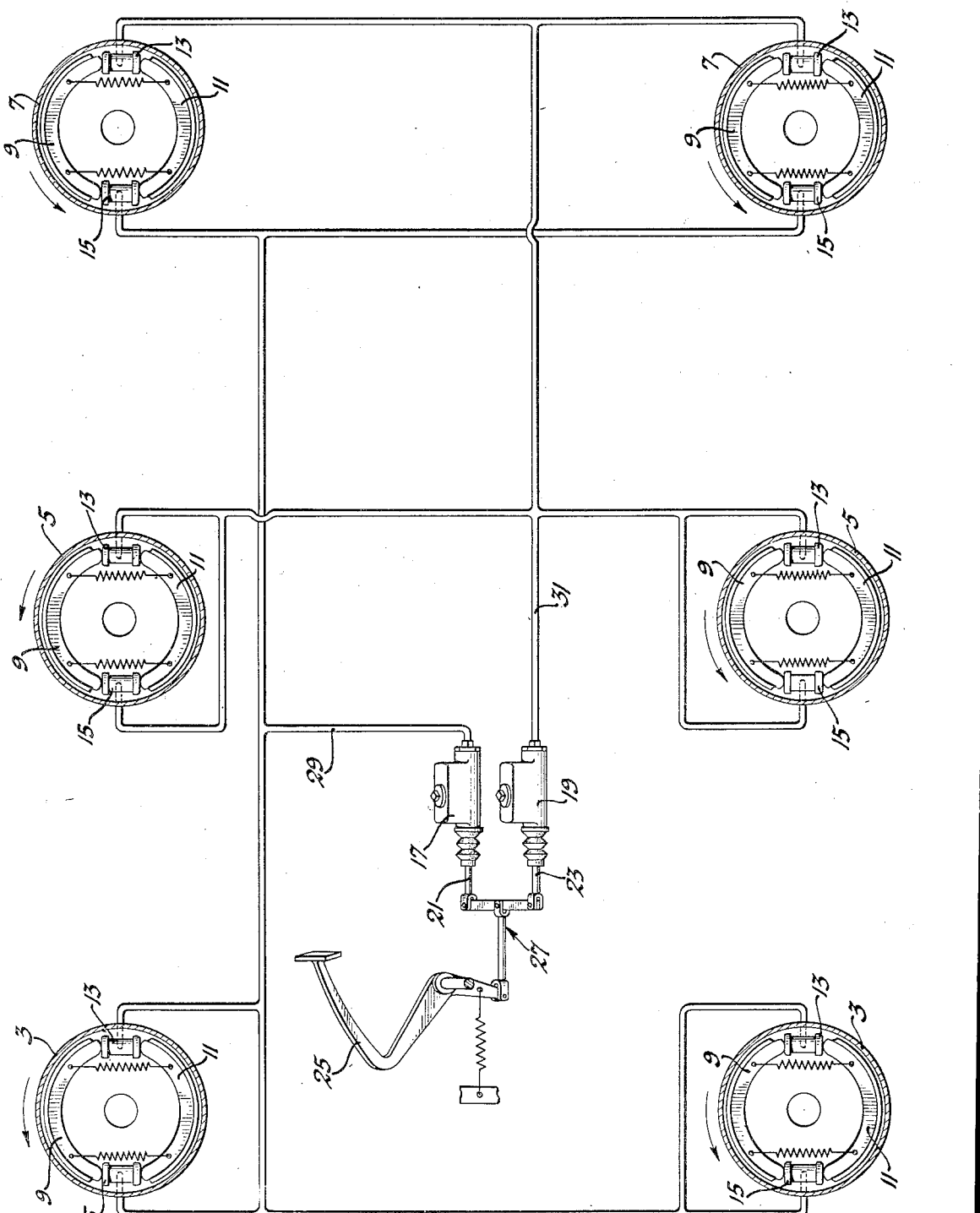
Inventor
Earle S. MacPherson
By
Blackmore, Spencer & Flint
Attorneys Patented July 13, 1943

2,324,007

UNITED STATES PATENT OFFICE 2,324,007

EQUALIZED HYDRAULIC BRAKE SYSTEM FOR SIX WHEELED VEHICLES

Earle S. MacPherson, Detroit, Mich., assignor to General Motors Corporation, Detroit, Mich., a corporation of Delaware Application November 6, 1942, Serial No. 464,764

3 Claims. (Cl. 188—152)

In the case of a six wheeled vehicle and especially one in which power is applied to all six wheels it is very important that effective and equalized braking be provided. The equalization is important to prevent a change in direction of travel due to the application of brakes.

The present invention is concerned with such a braking system and its object is to equip a six wheeled vehicle with efficient brakes, the efficiency being obtained by the use of brakes on all six wheels. A further object is to provide a two part system, preferably but not necessarily of the hydraulic type, so associated with the wheel brakes that, in the event of failure of one part, the other will apply brakes equally to the two sides of the vehicle. Other objects and advantages will be understood from the description which follows:

An embodiment of the invention is illustrated by the single diagrammatic figure of the accompanying drawing.

The invention as stated above is for a six wheeled vehicle. The vehicle is not shown. The wheels are not illustrated but their position is indicated by the six drums, drums 3 being the ones for the front wheels, 5 for the intermediate wheels and 7 for the rear wheels. Within each drum are shoes 9 and 11 the arrangement of shoes being the same in each case. Between the adjacent ends of the shoes are conventional wheel cylinders 13 and 15, two for each drum. As in prior known arrangements each wheel cylinder has two pistons operable upon the adjacent shoe ends when the pistons are spread apart by a suitable hydraulic medium forced into the wheel cylinders from a master cylinder. The shoes have no fixed anchorage but may anchor at either end upon the wheel cylinders. When the vehicle is so traveling that the drums rotate in the direction of the arrow, which may be assumed to correspond to forward vehicle travel, shoe 9 anchors on cylinder 15 and shoe 11 on cylinder 13. In case of reverse drum rotation shoe 9 anchors on cylinder 13 and shoe 11 on cylinder 15. Since all wheels are similarly equipped it will be obvious that, when fluid is applied to all wheel cylinders, every shoe is a self energizing shoe for both forward and rearward vehicle travel and a very efficient braking system is provided.

Lest failure somewhere in the systems develop and render all braking ineffective it is proposed to divide the operating mechanism into two parts and to so arrange the two parts that the braking performed by either part shall be equally effective on the two sides of the vehicle. In this way a failure in one part, leaves the other operative to produce lesser but equalized braking.

To accomplish the separation of the system into two parts there are used two master cylinders marked 17 and 19 having the usual pistons not shown and piston rods 21, 23. The rods are to be operated in unison. There is shown a pedal 25 and linkage 27 between the pedal and piston rods. This is to show a simple arrangement for simultaneously operating the two parts of the system. In practice, especially if the vehicle be large and heavy, there may be used some known form of booster, vacuum for example, through the use of which the manual effort is lessened. No invention is claimed for any booster device and none is shown. From cylinder 17 a conduit 29 supplies all the wheel cylinders of the front brakes. It also supplies two corresponding wheel cylinders 15 of the rear brakes. By this arrangement it will be seen that each shoe of the two front brakes is self-energizing for both directions of drum rotation while one shoe 11 only of each rear brake is self-energizing for forward vehicle travel. In a similar way master cylinder 19, by means of conduit 31, is so associated with the wheel cylinders of the intermediate brakes that all shoes are self-energizing whichever be the direction of vehicle travel. Also master cylinder 19 operates upon wheel cylinders 13 of the rear brakes and in the case of forward travel shoes 9 become self-energizing, drum rotation tending to resist the effect of cylinder 13 to spread the shoe 11.

If both parts of the system are intact all twelve shoes work with a self-energizing action to effect maximum braking. If one part fails lesser braking is available but the reduced total is divided equally between the brakes on the two sides.

I claim:

1. In a brake system for a six wheeled vehicle, three pairs of drums for the wheels, two shoes and shoe spreading means in each drum whereby when both spreading means are actuated each shoe is self-energizing for each direction of drum rotation, first and second applying means, connections whereby the first applying means actuates all the spreading means of a first pair of drums and one only of the spreading means of each drum of a third pair, and other connections whereby the second applying means operates the remaining spreading means.

2. The invention defined by claim 1, together with manually operable means for simultaneously operating said first and second applying means.

3. The invention defined by claim 1, said shoe spreading means being hydraulic wheel cylinders and said applying means being hydraulic master cylinders.

EARLE S. MacPHERSON.